US010705596B2

(12) United States Patent
Somareddy

(10) Patent No.: US 10,705,596 B2
(45) Date of Patent: Jul. 7, 2020

(54) SYSTEMS AND METHODS FOR RESPONSIVELY ADAPTABLE VIRTUAL ENVIRONMENTS

(71) Applicant: Neurological Rehabilitation Virtual Reality, LLC, Ft. Worth, TX (US)

(72) Inventor: Veena Somareddy, Fort Worth, TX (US)

(73) Assignee: Neurolofical Rehabilitation Virtual Reality, LLC, Fort Worth, TX (US)

( * ) Notice: Subject to any disclaimer, the term of this patent is extended or adjusted under 35 U.S.C. 154(b) by 0 days.

(21) Appl. No.: 15/975,451

(22) Filed: May 9, 2018

(65) Prior Publication Data
US 2019/0346915 A1    Nov. 14, 2019

(51) Int. Cl.
*G06F 3/01* (2006.01)
*G06F 9/455* (2018.01)
*G06F 3/048* (2013.01)

(52) U.S. Cl.
CPC .............. *G06F 3/011* (2013.01); *G06F 3/017* (2013.01); *G06F 3/048* (2013.01); *G06F 9/45558* (2013.01)

(58) Field of Classification Search
CPC .......... G06F 3/011; G06F 3/017; G06F 3/048; G06F 9/45558; G06F 3/04815; G06F 3/013
See application file for complete search history.

(56) References Cited

U.S. PATENT DOCUMENTS

| 6,106,437 | A | * | 8/2000 | Brooks | A63B 23/025 482/10 |
| 10,204,525 | B1 | * | 2/2019 | Tillis | G09B 5/02 |
| 2003/0120183 | A1 | * | 6/2003 | Simmons | A61F 4/00 600/595 |
| 2004/0058780 | A1 | * | 3/2004 | Edgeton | A63B 21/055 482/10 |
| 2007/0282228 | A1 | * | 12/2007 | Einav | A63B 21/4021 601/33 |

(Continued)

OTHER PUBLICATIONS

International Search Report and Written Opinion issued for PCT Application No. PCT/US2019/021532, dated Jun. 6, 2019, 9 pages.

(Continued)

*Primary Examiner* — Jose R Soto Lopez
(74) *Attorney, Agent, or Firm* — Norton Rose Fulbright US LLP

(57) ABSTRACT

The present disclosure relates to methods and systems for providing virtual environments that are responsively adaptable to users' characteristics. Embodiments provide for identifying a virtual action to be performed by a virtual representation of a patient within a virtual environment. The virtual action corresponds to a physical action by a physical limb of the patient in the real-world. In embodiments, the virtual action is required to be performed to a first target area within the virtual environment. Embodiments determine that the patient has at least one limitation that limits the patient performing the physical action. A determination of whether the patient has performed the physical action to at least a physical threshold associated is made. The virtual environment is caused to adapt in order to allow the virtual action to be performed in response to the determination that the patient has performed the physical action to the physical threshold.

20 Claims, 3 Drawing Sheets

(56) References Cited

U.S. PATENT DOCUMENTS

| | | | | |
|---|---|---|---|---|
| 2007/0282564 | A1* | 12/2007 | Sprague | G03B 21/14 |
| | | | | 702/141 |
| 2008/0319252 | A1* | 12/2008 | Chapman | A61M 21/02 |
| | | | | 600/27 |
| 2010/0016730 | A1* | 1/2010 | Tanaka | A61B 3/024 |
| | | | | 600/476 |
| 2011/0043537 | A1* | 2/2011 | Dellon | G09B 9/00 |
| | | | | 345/647 |
| 2011/0230792 | A1* | 9/2011 | Sarig-Bahat | A61B 5/1124 |
| | | | | 600/595 |
| 2012/0245492 | A1* | 9/2012 | Lee | A61B 5/1114 |
| | | | | 600/595 |
| 2013/0009853 | A1* | 1/2013 | Hesselink | G02B 27/017 |
| | | | | 345/8 |
| 2014/0121018 | A1* | 5/2014 | Burdea | A63F 13/06 |
| | | | | 463/36 |
| 2015/0141773 | A1 | 5/2015 | Einav et al. | |
| 2016/0038075 | A1* | 2/2016 | Burdea | A61B 5/4088 |
| | | | | 434/258 |
| 2017/0025026 | A1 | 1/2017 | Ortiz Catalan | |
| 2018/0151258 | A1* | 5/2018 | Sánchez Vives | G09B 5/065 |
| 2018/0165854 | A1* | 6/2018 | Du | G06F 3/01 |
| 2019/0030394 | A1* | 1/2019 | Orr | G02B 27/0176 |
| 2019/0060708 | A1* | 2/2019 | Fung | G06F 3/011 |
| 2019/0065970 | A1* | 2/2019 | Bonutti | G08B 21/02 |

OTHER PUBLICATIONS

International Search Report and Written Opinion issued for PCT Application No. PCT/US2019/053342, dated Aug. 1, 2019, 8 pages.

\* cited by examiner

SYSTEMS AND METHODS FOR RESPONSIVELY ADAPTABLE VIRTUAL ENVIRONMENTS

CROSS-REFERENCE TO RELATED APPLICATION

The present application is related to U.S. application Ser. No. 15/919,165 filed Mar. 12, 2018 and entitled "SYSTEMS AND METHODS FOR NEURAL PATHWAYS CREATION/REINFORCEMENT BY NEURAL DETECTION WITH VIRTUAL FEEDBACK," the disclosure of which is incorporated by reference herein in its entirety.

TECHNICAL FIELD

The present invention relates generally to physical therapy technologies, and more particularly to systems with responsively adaptable virtual environments.

BACKGROUND OF THE INVENTION

Virtual reality (VR) technology is a useful technology that has applications in many and various fields. VR systems provide a virtual environment into which a user may be immersed, or semi-immersed. The virtual environment may be presented to the user in such a way that the virtual environment supersedes the real-world environment, thereby creating a suspension of disbelief and convincing the user's brain to experience the virtual environment as real, wherever/whatever that virtual environment may be. Some VR systems allow the user to interact with the virtual environment, or with particular objects within the virtual environment. As such, VR technologies have a plethora of applications, especially in situations in which a user interaction with a virtual environment that may mimic interactions within a real-world environment may be beneficial.

For example, one application of VR technologies is in gaming. In gaming, a player may be immersed, or semi-immersed into the VR game environment, and may be allowed to interact with objects within the VR game environment. In that sense, the user may experience the VR game environment as real. Another application of VR technologies is in military simulations. VR systems may be used to train soldiers before the soldiers are deployed in the real-world. The virtual simulations provided by the VR systems allow soldiers, and teams of soldiers, to practice performing tasks, and working together, in simulated environments before they have to use real-world equipment.

Another application of VR technologies is in mental health, such as in exposure therapy. In virtual therapy, a patient may be immersed, or semi-immersed, into a virtual environment and may navigate the virtual environment, interacting with harmless virtual representations of traumatic stimuli in order to reduce fear responses. In other applications, virtual therapy may be used to treat patients with limited motor function control. In this case, physical therapy may be aided by VR systems in which a patient is immersed, or semi-immersed into a virtual reality environment and required to perform activities interacting with the virtual environment. For example, the patient may be presented with a VR game, or some other VR activity, that requires exercising the affected muscle, or muscle groups. In this manner, physical therapy exercises can be performed while the patient experiences those exercises as some activity in the virtual world.

One of the benefits of VR technologies is that the immersive virtual environment may be designed to capture the attention of the user. For example, a patient with a whiplash injury may be required, as part of physical therapy, to perform neck exercises such as looking up. The repetitive nature of the exercise may discourage most patients, and it has been found that most physical therapy patients do not persist in doing the required exercises precisely because the exercises are repetitive, boring, and discouraging. It is also noted that, even for non-injured people, regular workouts are not part of their lifestyle because the workout exercises can be repetitive and discouraging. However, in a virtual environment, the exercises can be "hidden" as part of a game, or some other fun activity. In this way, a patient may be encouraged to interact with the virtual environment in such a way that the interaction requires performing the required exercises, but with the patient experiencing the activity as part of the virtual environment. For example, a whiplash patient in a virtual environment may play a game catching falling bubbles, which would require the patient to look up as the bubbles fall. In the next session, a different VR game may be played. Thus, in this manner, the patient would be performing the required exercises in a fun way and will be encouraged to persist.

However, these existing VR systems have no mechanisms or functionality to address the challenges when a user with limitation that may prevent or limit the user from interacting with the virtual environment, or from completing tasks in virtual therapy. As such, the user's inability to perform the task may discourage the user from continuing with the task and thus, may have a counterproductive effect and the user may not appreciate or receive the benefits of the virtual therapy. In some cases, the user may become discouraged and may not continue the virtual therapy at all. In other cases, the virtual therapy activities may be such that performing the activities may cause discomfort or harm to the user with limited flexion and/or mobility.

BRIEF SUMMARY OF THE INVENTION

The present invention is directed to devices, systems, and methods that implement a technological solution for implementing therapeutic devices that provide virtual environments that are responsively adaptable to users' characteristics. The systems, devices, and techniques disclosed herein may be used in physical therapy, where an affected limb may have limited motor function, or flexion. Using the techniques of the present disclosure, a system may be provided that may allow a virtual patient to perform virtual tasks, and therefore gain the benefits of virtual therapy, despite physical limitations.

In one embodiment, a method of responsively adapting a virtual environment to physical therapy patients may be provided. The method may include providing/identifying a virtual task to be performed by a patient within a virtual environment. The virtual task may include, for example, at least one virtual action by a virtual limb of the patient in the virtual environment that corresponds to at least one physical action by a physical limb of the patient in the real-world. Performing the virtual task may require performing the at least one virtual action to at least a target area within the virtual environment. The method may also include determining that the patient may have a limitation with respect to the at least one physical action. The at least one limitation may limit the patient to performing the at least one physical action. The method may further include determining whether the patient has performed the at least one physical action to at least a threshold area. The threshold area may correspond to a virtual space different than the target area within the virtual environment. The method may also include causing, in response to determining that the patient has performed the at least one physical action to at least the threshold area, the virtual environment to adapt in order to allow the at least one virtual action to be performed within the virtual environment.

In other embodiments, a system for responsively adapting a virtual environment to physical therapy patients may be provided. The system may include at least one sensor configured to detect data associated with a physical limb of a patient, and a virtual representation unit configured to display a virtual environment. The virtual environment may include at least one interactable virtual object located at a virtual target area of the virtual environment, and a virtual representation of the patient within the virtual environment. The system may also include a controller communicatively coupled to the at least one sensor and the virtual representation unit. The controller may be configured to provide/identify a virtual task to be performed by the virtual representation of the patient within the virtual environment. The virtual task may include, for example, at least one virtual action upon the at least one interactable virtual object by a virtual limb of the virtual representation within the virtual environment, and the at least one virtual action may correspond to at least one physical action by the physical limb of the patient in the real-world. Performing the virtual task may require performing the at least one virtual action to at least the virtual target area within the virtual environment. The controller may be further configured to determine that the patient has at least one limitation with respect to the at least one physical action. The at least one limitation may limit the patient performing the at least one physical action. The controller may also be configured to determine, based on the data detected by the at least one sensor, whether the physical limb of the patient has performed the at least one physical action to at least a physical threshold. The physical threshold may correspond to a virtual space different than the virtual target area within the virtual environment. The controller may also be configured to cause, in response to determining that the patient has performed the at least one physical action to at least the threshold area, the virtual environment to adapt in order to allow the at least one virtual action to be performed within the virtual environment.

In yet another embodiment, a method of responsively adapting a virtual environment to a user may be provided. The method may include providing/identifying a virtual task to be performed by a virtual representation of a user within a virtual environment. The virtual task may include, for example, at least one virtual action by the virtual representation of the user in the virtual environment that corresponds to at least one physical action by the patient in the real-world. The virtual task may require performing the at least one virtual action to a first level of performance. The method may also include determining that the patient has at least one limitation with respect to the at least one physical action. The at least one limitation may limit the user to performing the at least one physical action to a second level of performance different than the first level of performance. The method may further include determining that the user has performed the at least one physical action to at least the second level of performance. The method may also include causing, in response to determining that the user has performed the at least one physical action to at least the second level of performance, the virtual environment to adapt in order to allow the virtual representation to perform the at least one virtual action within the virtual environment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
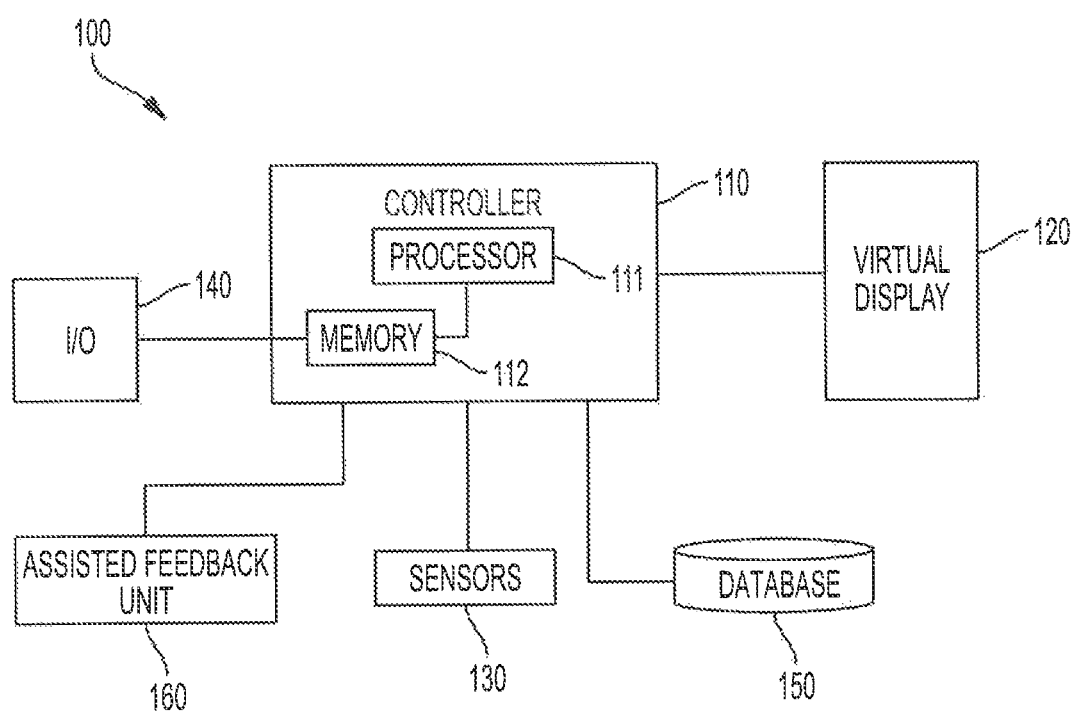
FIG. 1 shows system configured to perform operations in accordance with embodiments of the invention.

It is noted that as used herein, the term "characteristics" of a user may refer to a user's abilities and/or limitations with respect to particular activities, and may include a user's limitations, abilities, mobility range, flexion range, etc. For example, a particular user's characteristics may include a user's ability, or inability, to stand, or to walk. In another example, a user's characteristics may include the user's flexion range, such as the range of extension or contraction of the user's limbs. It is also noted that although the present disclosure is discussed within the context of virtual reality, the systems and techniques discussed herein may also be applicable to systems that provide mixed reality, and/or augmented reality environments. Therefore, the examples discussed herein with respect to virtual reality are for illustrative purposes and should not be construed as limiting.

As used herein, a target action may refer to an intended or desired action related to a patient's motor function. For example, for a therapy patient with limited arm flexion, a target action may refer to a desired action of reaching for and grabbing a virtual object, or to a desired action of moving a virtual object from one virtual location to another. In some cases, performing the target action in the virtual environment may comprise performing a physical action related to the patient's motor functions in the real-world. For example, grabbing the virtual object and moving it from one virtual location to another one may comprise extending and/or contracting the patient's real world arm (and correspondingly the patient's virtual arm).

It is also noted that the discussion herein focuses on operations with respect to an affected limb. However, it will be appreciated that the present disclosure is also applicable to situations in which the motor function affected is related to a site that may not necessarily be referred to as a limb, e.g., a facial muscle, neck muscle, etc. Thus, it will be appreciated that the devices and methods discussed in the present disclosure may also be applicable when the affected motor function is associated with any muscle or muscle group of a patient. It should be appreciated that although the present disclosure is described within the context of a virtual retail therapy game, the systems and techniques described herein may be applicable to other virtual environments requiring other types of tasks. For example, the virtual environment may be one in which a user is required to move from location to another, such as by walking, jogging, etc., which may be applicable in physical therapy.

Various features and advantageous details are explained more fully with reference to the non-limiting embodiments that are illustrated in the accompanying drawings and detailed in the following description. Descriptions of well-known materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The inventors have found that, for all their benefits, existing VR systems have a major deficiency. Existing VR systems lack the functionality to adapt the virtual environment in response to a particular user's characteristics. For example, a user with limited motor function or limited flexion may experience the virtual environment, but may be unable to fully interact with the virtual environment due to the user's limitations. In this example, the user may be required to grab a virtual item from a particular location within the virtual environment, but due to the user's limited arm flexion, and due to the VR system's inability to adapt the virtual environment to the user's limitations, the user may not be able to extend the arm to grab the item. In this case, the user's inability to perform the task may discourage the user from continuing with the task and thus, may have a counterproductive effect and the user may not appreciate or receive the benefits of the virtual therapy. In some cases, the user may become discouraged and may not continue the virtual therapy at all. In other cases, the virtual therapy activities may be such that performing the activities may cause discomfort or harm to the user with limited flexion and/or mobility.

The inventors have found that the lack of adaptable functionality of current VR systems also presents problems for developers and users in that the systems are beneficial only to a subset of users that may have characteristics to which the system has been programmed or designed. For example, a particular virtual environment in an existing VR system may be designed for users who are able to stand, or walk. As such, the VR system may not be beneficial to a user who is unable to stand or walk. Therefore, another virtual environment may have to be developed for the user who is unable to stand. As will be appreciated, this would require developing a large number of virtual environments in order to cover different situations and cases. This, of course, would make for a very complex, resource intensive, and expensive VR system. Thus, the present disclosure provides a solution to the current deficient state of the art by providing systems in which virtual environments may be responsively adaptable to users' characteristics, or limitations.

FIG. 1 illustrates a system 100 configured in accordance with embodiments of the present disclosure. The configuration of system 100 may facilitate operations for providing virtual environments that are responsively adaptable to users' characteristics as described in embodiments of the present disclosure. As shown in FIG. 1, system 100 may include controller 110, virtual reality (VR) display 120, sensors 130, input/output (I/O) unit 140, database 150, and assisted feedback unit 160. In some embodiments, controller 110 may include processor 111 and memory 112. These components may cooperatively operate to provide functionality in accordance with the discussion herein.

VR display 120 may be configured to facilitate presentation of a responsively adaptable virtual environment to a user. In some aspects, the responsively adaptable virtual environment may be provided by controller 110, as discussed below. A user may be immersed into the responsively adaptable virtual environment via VR display 120. The virtual environment may be configured to facilitate virtual tasks to be performed by the user within the virtual environment. These virtual tasks may have associated actions in the real-world, and performing the virtual tasks may include the user performing the real-world actions. For example, in one particular implementation, system 100, under control of controller 100 cooperatively operating with VR display 120, may generate a virtual environment in which a user is to grab virtual objects from a virtual shelf within the virtual environment, and then deposit the virtual objects into a virtual cart. This may be referred to as virtual retail therapy (VRT). In embodiments, the VR display 120 may be configured to display the virtual environment in which VRT is performed.

In some embodiments, VR display 120 may comprise a virtual reality device, an augmented reality device, a mixed reality device, a computer screen, a television screen, a projector, and/or any device configured to display a virtual representation of a patient, or a virtual representation of a portion or part of a patient. For example, VR display 120 may be a headset, or any other VR display configured to display a virtual avatar that may represent the patient undergoing physical therapy. In aspects, the virtual avatar may be configured with the physical attributes of the patient so that the patient may better relate to the virtual avatar. For example, the virtual avatar may include attributes similar to the patient's attributes, such as body shape, skin color, height, weight, hair color, age, gender, etc. In these cases, the virtual avatar may be associated with a particular patient and may be stored in database 150. In other aspects, the virtual avatar may be generic and may be similar regardless of the particular patient using the system.

In some embodiments, VR display 120 may be configured to display the virtual avatar, or a virtual limb, such that the position of the virtual limb within the virtual environment may correspond to the position of the corresponding physical limb of the patient in the real-world environment, and such that the patient may perceive the virtual limb as part of the patient. For example, a virtual avatar limb may be displayed within the virtual environment of VR display 120 such that the virtual avatar limb may be positioned in a location and arrangement corresponding to the position and arrangement of the real-world limb of the patient. In this case, the patient, while looking at the position within the virtual environment corresponding to the position where the real-world limb of the patient may be, may observe the virtual avatar limb instead. Thus, the patient may perceive any action represented in the virtual environment as an action performed by the patient, and the patient may be thus, said to be immersed into the virtual environment. In some cases, the virtual environment may be overlaid over the real-world, such as in mixed and/or augmented reality. In this case, the patient may perceive the virtual environment and the real-world simultaneously, or near simultaneously, and thus, may be said to be semi-immersed. It will be appreciated that the improvements, benefits, and advantageous of the systems and techniques disclosed herein are obtainable whether the full immersion or semi-immersion is used.

Controller 110 may be configured to provide functionality in accordance with aspects of the present disclosure. In some embodiments, controller 110 may also be configured to receive sensor data from sensors 130, to analyze and process the sensor data, to determine user's characteristics, and to responsively adapt a virtual environment based on the sensor data and the user's characteristics in accordance with the discussion herein.

Controller 110 may be implemented using a desktop computer, a laptop computer, a smartphone, a tablet computing device, a personal digital assistant (PDA), another type of wired and/or wireless computing device, or part thereof. Controller 110 may include processor 111 and memory 112. In embodiments, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 111 may comprise code segments (e.g., software, firmware, and/or hardware logic) executable in hardware, such as a processor, to perform the tasks and functions described herein. In yet other aspects, processor 111 may be implemented as a combination of hardware and software.

Processor 111 may be communicatively coupled to memory 112. Memory 112 may comprise read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 112 may store instructions that, when executed by processor 111, cause processor 111 to perform operations in accordance with the present disclosure.

In some aspects, controller 110 may be configured to generate the responsively adaptable virtual environment into which the user may be immersed. The virtual environment may be provided to VR display 120 for presentation to the user. As noted above, in some implementations, a VRT virtual environment may be provided. In VRT, a user may be required to grab virtual objects from a virtual shelf within the virtual environment, and then deposit the virtual objects into a virtual cart. As will be appreciated, the action of grabbing the virtual objects, and also the action of positioning the virtual objects into the virtual cart, may require the user to extend and contract his or her arm to reach for the virtual objects on the virtual shelves, or to perform other actions in order to compete the tasks. Without the responsively adaptable virtual environment provided by the present disclosure, the user, having limited flexion, would extend his or her real-world arm, an action that may be replicated in the virtual environment, but may not be able to reach the virtual object within the virtual environment because of the limited flexion. Thus, the user of a system without the responsively adaptable virtual environment provided by the present disclosure, and with limited flexion, would not be able to complete the required tasks in VRT. As discussed above, this lack of functionality may prevent the user from engaging with the VRT environment and may lead to the user being discouraged.

In embodiments, controller 110 may be configured to perform operations to allow a virtual environment to be responsively adaptable to the user's characteristics. Controller 110 may determine characteristics of a user, e.g., controller 110 may determine that the user has limited flexion of the arm, or may determine that the user has mobility limitations. In some embodiments, the user's characteristics may be predetermined. For example, the user's characteristics may be specified by the user, or a therapists, and may be provided to controller 110. In some embodiments, the user's characteristics may be entered into the system using I/O unit 140, and may be stored in database 150, to be subsequently retrieved and provided to controller 110. In other embodiments, the user's characteristics may be dynamically determined based on data collected during operation. As will be discussed in further detail below, sensors 130 may collect sensor data from the user, and the sensor data may be provided to controller 110. The sensor data may be processed by controller 110, and controller 110 may determine that the sensor data indicates that the user has limited flexion. In some cases, the determined user's limitations may be stored in database 150, and may be provided to the user and/or therapists, e.g., for therapy progress reports, via I/O unit 140. For example, in a system for VRT, controller 110 may determine that a user has limited arm flexion, and may determine that the capabilities of the limited flexion include 40% extension of the arm. In this VRT example, in which a user may be required to reach for a virtual object, grab the virtual object, and then deposit the virtual object into a virtual cart, reaching for and grabbing the virtual object from the location of the user within the virtual environment may require a 70% flexion. In this case, even if the user extends his or her arm to the full user's flexion limit of 40%, the user would not be able to reach the virtual object and thus, would be unable to grab the object and complete the VRT task. However, the responsively adaptable virtual environment provided by the present disclosure addresses this problem.

In embodiments, controller 110 may be configured to determine that the user has reached, or is reaching, for a virtual object based on the location of the user with respect to the virtual object. In one particular implementation, the determination that the user has reached, or is reaching, for a virtual object may be based on the location of the user's arm or hand with respect to the virtual object. For example, in embodiments, an area of interactivity around a virtual object may be established. In other examples, the virtual object may be determined to be within a virtual area, and the virtual area may be referred to as a virtual target area. In some aspects, the virtual target area may refer to a three-dimensional space, area, or threshold within the virtual environment within which the virtual object may be located. In these embodiments, reaching the virtual object may require reaching at least the virtual target area.

Sensor data collected by sensors 130 and processed by controller 110 may indicate the user's hand location in the real-world, which may be used to establish a location of the user's virtual hand within the virtual environment. The location information may be used to determine that the user's virtual hand has entered the established area of interactivity around the virtual object. In this case, controller 110 may determine that the user is reaching for the virtual object. In an alternative embodiment, controller 110 may determine that the user is reaching for an object by determining that the user's gaze within the virtual environment is placed upon the virtual object. In this case, when the user is "looking" at the virtual object, controller 110 may determine that a movement of the user's hand, in combination with the user's gaze, toward the object indicates that the user may be reaching for the virtual object.

In some cases, a patient may have limited or no use of a particular limb. In these cases, embodiments of the present disclosure may provide functionality that may be used in therapy, such as a mirror therapy, to give the patient the illusion that the patient has control of an affected limb. For example, a patient's condition may prevent the patient from using his or her right hand, but may permit the patient from using his or her left hand. In this example, the patient may use his or her left hand to control the opposite virtual right hand. The system of embodiments may be configured to, when the patient moves the physical left hand, cause the patient's right virtual hand to mirror the actions of the physical left hand. In this case, the patient may use the able limb to control the opposite virtual limb. Thus, the patient may visualize the right virtual hand performing the actions and may give the illusion that the patient has control of his or her right hand, while actually moving the left hand.

In some embodiments, the system may learn as therapy progresses, and may adapt the area of interactivity, or a virtual target area where a virtual object may be located, by scaling the area in response to therapy progress. For example, during the initial stages of therapy, a relatively large area of interactivity, or virtual target area, may be established around the virtual object. As therapy progress and the patient's limitations decrease, in subsequent sessions, the area of interactivity, or virtual target area within which the virtual object is located, may be decreased in response to the patient's increased abilities with respect to the virtual action.

Controller 110 may be configured to adapt the virtual environment in response to the user's characteristics. Following the example discussed above, as the user with limited arm flexion reaches for the virtual object, the user's flexion may not be enough to reach the virtual object. For example, the user's flexion may be 40%, but reaching the virtual object from the location of the user within the virtual environment may require a 70% flexion. In response to a determination that the user has reached the user's flexion limit, or has reached a particular value that is within a threshold value under or above the user's flexion limit, system 100 of embodiments, under control of controller 110, may modify the virtual environment by compensating for the difference between the user's flexion limit, and the required flexion to complete the task. In embodiments, controller 110 may determine that the user has performed the physical action to at least a physical threshold. The physical threshold may refer to a three-dimensional space, area, or threshold within the real-world environment that corresponds to a virtual space within the virtual environment. In aspects, the virtual space corresponding to the physical threshold may be different than the virtual target area within which the virtual object may be located.

In one particular embodiment, controller 110 may be configured to compensate for the difference between the user's flexion limit and the required flexion to complete the task, or the difference between the virtual space and the virtual target area within, by modifying the virtual environment such that the virtual action may be competed. For example, controller 110 may modify the virtual environment such that virtual object is made reachable by the particular user at the user's flexion limit, or at the particular value within the threshold value under or above the user's flexion limit. For example, in one embodiment, as the user reaches 40% flexion value while extending his or her arm to reach for the virtual object, controller 110 may cause the virtual environment to be modified (such as by moving the virtual object toward the user as the user reaches for the virtual object to compensate for the user's limitations), such that the user may be able to reach the virtual object at 40% flexion, instead of the required 70%.

In alternative embodiments, the determination to make the virtual object reachable to the user may be made in response to the user reaching a threshold value that may be a fraction, or percentage of the user's capabilities. For example, the virtual object within the virtual environment may be made reachable by the user when the user with a 40% flexion limitation is determined to have extended his or her arm to within 10% of the flexion limit, which in this example may be at least 36% flexion. In another example, the virtual object within the virtual environment may be made reachable by the user when the user with a 40% flexion limitation is determined to have extended his or her arm to at least 10% above the flexion limit, which in this example may be at least 44% flexion. In this case, extending the threshold beyond the user's limitation may encourage the user to push beyond his or her limits. It should be appreciated that these threshold values, which may be specified by the user or therapist using I/O unit 140 and may be stored in database 150, may be determined to be safely attainable by the patient, and in this manner, system 100 may provide a safe way to push the patient beyond this limits, but in a way that is based on the patient's specific limits. Existing systems do not consider the patient's limits and thus, may in fact prove to be unsafe when the user attempts to complete a task with requirements beyond the patient's actual limits, as the existing virtual environments are not responsive to the user's limitations.

In yet another embodiment, the determination to make the virtual object reachable to the user may be made in response to the user's action pausing for a particular period of time. In some implementations, when the user's action pauses for a particular period of time, controller 110 may determine that the user has reached the limit of the user's ability with respect to the action, and may determine to make the virtual object reachable by the user. In some aspects, the period of time may be based on a timer. The timer may be started when it is determined that the user's virtual avatar has entered the established area of interactivity around the virtual object. The timer may be specified by the user or therapist via I/O unit 140 and may be stored in database 150. As will be appreciated, in this embodiment, whether a user's action takes the user to a limit of a particular characteristic, or to within a threshold value of the particular characteristic, may not be determined, as the determination to make the object reachable is made in response to the user's action pausing within the area of interactivity around the virtual object.

In some aspects, the virtual object may be made reachable by the user by bringing the virtual object toward the user virtual avatar such that the user may reach and grab the virtual object when it is determined that the user has reached the physical limits associated with a particular characteristics of the user, or has reached a value within a threshold of the physical limits, as discussed above. In other aspects, the virtual object may be made reachable by the user by moving the user's avatar toward the virtual object within the virtual environment such that the virtual object is reachable by the user. In yet other aspects, the virtual object may be made reachable by the user by moving the entire virtual shelf, in which the virtual object may be, toward the user virtual avatar such that the user may reach and grab the virtual object.

In some embodiments, as the user reaches for the virtual object, the system may be aware of the user's physical limits. In these cases, the system may exaggerate the virtual action, corresponding to the physical action, such that completion of the physical action to the physical limits may correspond to completion of the virtual action. For example, controller 110 may determine that the user has characteristics that include limited arm flexion of 40%, but reaching a virtual object from the location of the user within the virtual environment may require 70% flexion of the arm. In this case, controller 110 may operate to modify the virtual environment such that 40% real-world physical flexion corresponds to the required 70% virtual flexion, or to modify the virtual environment such that the virtual action may be completed with the 40% real-world physical flexion. As such, the user may perceive a 40% physical flexion as 70% flexion in the virtual environment, which would make the virtual object reachable to the user. In addition, the virtual action of reaching for the virtual object may be perceived as a smooth action within the virtual environment, rather than as an action of extending the arm and then having the virtual object brought toward the virtual avatar, which the latter may seem less smooth.

In embodiments, determining whether a user's action takes the user to a limit of a particular characteristic, or to within a threshold value of the particular characteristic, may be based on sensor data. For example, sensor data received from sensors 130 may be processed by controller 110 to determine where the user is with respect to a particular characteristic. For example, sensor data may indicate that a user has currently extended an arm to 40%. This information may be compared to a limit associated with the particular characteristic. For example, controller 110 may compare the current extension of the user's arm to the user's arm flexion limitation, which may be 40%. In this case, controller 110 may determine that the user's action of extending the arm to 40% has reached the limit of the user's arm flexion. In another example, controller 110 may compare the user's current arm extension of 40% to a threshold value of 10% above the user's flexion limit of 40%, which may be 44%, and may determine that the user has not reached the limits of the user's flexion. In this case, controller 110 may not operate to make the virtual object reachable. However, in this example, when the user extends the arm to 44%, controller 110 may determine that the target value has been reached and may make the virtual object reachable to the user.

It is noted that in some embodiments, controller 110 and virtual display 120 may be implemented in a single device, rather than separate devices. For example, controller 110 and virtual display 120 may be implemented as a single device that may be placed on a patient. In this example, the processing and analysis of the measured sensor data and the modification of the virtual environment based on the measured sensor data and the user's characteristics may be performed by operations in the single device. In alternative embodiments, controller 110 and virtual display 120 may be implemented as separate units, communicatively coupled to one another. In aspects, controller 110 and virtual display 120 may configured for wired and/or wireless communications.

System 100 may include sensors 130. Sensors 130 may comprise at least one sensor configured to measure or capture data that may include conformation, location, movement, speed, velocity, tilt, position, force, acceleration, etc., measured at the target site. The captured sensor data may be related to a particular action. For example, sensors 130 may be configured to take measurements with respect to a flexion status of a limb, including whether a limb has moved or may be moving, the speed of the movement, the extent or range of the movement, the location of the limb with respect to the virtual environment, etc. In this manner, the measurements captured by sensors 130 may indicate whether a limb is extended or contracted, or extending or contracting, how much the limb has extended or contracted, whether the action of the limb has paused, the location of the limb with respect to the virtual environment, etc. This sensor data and information may be used to determine the status of the user's limb with respect to a particular action, such as reaching or and/or grabbing a virtual object, moving the virtual object from one place to another, or moving within a virtual environment.

Regarding the location of the limb with respect to the virtual environment based on the measurements captured by sensors 130, it is noted that, using the sensor data from sensors 130, a location of a target limb within the real world may be determined. Using this location data of the real-world limb, a determination of the corresponding location of the virtual limb within the virtual environment may also be made. This may allow system 100 to determine the location of the virtual limb within the virtual environment. A similar process may be used using other sensor data. In this manner, the target limb's real-world action may be replicated as a simulated action in the virtual environment.

In some aspects, sensors 130 may be configured to be placed upon the user's target site. For example, sensors 130 may be configured to be mounted on a user's arm, hands, legs, torso, etc. As such, sensors 130 may take measurements of the corresponding target site. In other aspects, sensors 130 may be configured to capture target site data without being placed upon the user's target site. For example, sensors 130 may be mounted external to the patient, such as motion detectors that are placed around the real-world environment and mounted on stands around the area where the systems' user may move.

In embodiments, sensors 130 may comprise a sensor array that includes at least one sensor. In aspects, the sensors in the sensor array may be similar sensors configured to capture a particular type of data. For example, the sensors in the sensor array may be similarly configured to capture acceleration. In other aspects, the sensors in the sensor array may be configured to capture different types of data. For example, one sensor in the sensor array may be configured to capture acceleration, while another sensor may be configured to capture location.

Sensors 130 may be communicatively coupled to controller 110. In some aspects, the sensor data captured by sensors 130 may be provided to controller 110. Controller 110 may be configured to process the sensor data and determine any modifications to be made to the virtual environment, as discussed in more detail above.

In some aspects, not all sensor data may be used to modify the virtual environment. For example, some of the sensor data may be used to determine whether and how the user patient is progressing during therapy. This progress determination may be made by comparing sensor data related to a particular target action over therapy sessions. For example, sensor data associated with a particular target action may be stored in database 150 at a first therapy session. During a subsequent therapy session, sensor data associated with the particular target action may be collected. The sensor data collected during the subsequent therapy session may be compared with the sensor data collected during the first therapy session to determine if there has been an improvement with respect to the target action. The therapy progress determination may be made over time and subsequent therapy sessions to ascertain how the patient is progressing. A progress report may be made available to the user patient and/or to a therapist. The user patient and/or the therapist may access the report using I/O unit 140.

In some embodiments, the determined progress may be used to dynamically and automatically adjust the compensation of the virtual environment in response to the measured sensor data and the patient's characteristics. For example, a patient, at the initial stages of therapy may be capable of extending an arm to only 40% flexion. In this case, the 40% arm flexion may be established as one of the patient's characteristics. During an initial therapy session, system 100 may perform operations to responsively adapt a virtual environment to the patient based on the 40% flexion.

In some embodiments, system 100 may include I/O unit 140. I/O unit 140 may include a display, and may be configured to display a graphical user interface (GUI) structured to facilitate input and output operations in accordance with aspects of the present disclosure. I/O unit 140 may be configured to accept input from users, such as a patient or a therapist that may be used to specify patient's characteristics, such as flexion and/or motor function limitations, the affected motor function, the associated limb, thresholds for determining that an action is complete, timers for determining that an object is to be made reachable, size of areas of interactivity around virtual objects, etc. Thus, for example, a therapist may use I/O unit 140 to specify a target action, a size of an area of interactivity around a virtual object and to specify a timer for determining that the object is to be made reachable. For example, a user, or a therapist, may use I/O unit 140 to specify a target action of moving virtual objects from one place to another, to specify that entering a virtual area around a particular object for at least a threshold amount of time (e.g., 5 seconds) may cause the virtual object to be reachable. In this example, the patient may be required to grab virtual objects from a shelf within the virtual environment, and then deposit the virtual objects into a virtual cart. When the virtual avatar, such as a virtual hand of the user, enters the area of interactivity around the virtual object, and remains within the area of interactivity for at least 5 seconds, the virtual object is made reachable by the user, in accordance with the aspects of the present disclosure. As such, the user may grab the object and deposit it into the virtual cart. It is noted that the threshold amount of time to cause the virtual object to be made reachable may be based on the user's behavior. For example, the threshold amount of time may be less than an amount of time at which a user may become agitated due to a lack of action in the simulation. In some aspects, the threshold amount of time may be any amount of time between 1 and 10 seconds.

In aspects, as the level of difficulty of the simulation increases, the threshold amount of time may also be increased. Additionally, the area of interactivity around a virtual object may also be increased as the difficulty of the simulation increases. The level of difficulty of the simulation may be automatically increased by the system based on user's capabilities, therapy progress, etc., or may be manually set by a therapist using I/O unit 140.

In embodiments, I/O unit 140 may be configured to provide output which may present, display, or reproduce the virtual environment. In these cases, a therapist may be able to monitor what the patient is perceiving in the virtual environment.

In embodiments, system 100 may also include database 150 configured to facilitate storage operations. Database 150 may be configured to store previously measured sensor data, target actions, threshold values, timers, user profile information, etc. In some aspects, database 150 may be integrated into memory 112, or may be provided as a separate module. In yet other aspects, database 150 may be a single database, or may be a distributed database implemented over a plurality of database modules. Database 150 may be configured to store information for a plurality of patients. In some cases, the information may be used in training and learning operations.

System 100 may include assisted feedback unit 160. Assisted feedback unit 160 may include a wearable device that may be placed on a target site associated with an affected motor function, such as a limb with limited flexion, and may be configured to assist or to force movement of the target site by means of mechanical force, or to provide resistance to movement of the target site. For example, assisted feedback unit 160 may include a glove, an arm or leg brace, or any other wearable device that may be placed upon a target site and may be configured to assist or force bending, twisting, flexing, extending, etc., of the target site. In some aspects, the mechanical means for assisting or forcing the movement may include motors, actuators, hydraulic actuators, pneumatic actuators, pressure-based actuators, etc. In some embodiments, assisted feedback unit 160 may include mechanical means for preventing the target site from being moved, thereby providing resistance training to be used during therapy to strengthen the target site.

Assisted feedback unit 160 may be communicatively coupled to controller 110, and may be configured to receive a physical feedback signal from controller 110 based on a virtual action being performed in the virtual environment generated by controller 110. In this manner, assisted feedback unit 160 may replicate the virtual action in the real-world to assist the user in performing the action. The physical feedback signal may include a signal that drives assisted feedback unit 160 to perform an assisted action in the real-world.

In embodiments, the physical feedback signal may specify various parameters for the target action to be performed by assisted feedback unit 160. For example, the feedback signal may specify the amount of flexion, the speed of the movement, and/or the direction of the movement associated with the target action. In an exemplary case of a target action being a walking motion, the associated physical feedback signal may specify how fast the walking motion is to be performed, the direction of the motion, and/or the length of the stride. In some embodiments, assisted feedback unit 160 may be configured to respond to the physical feedback signal and to position, by use of the mechanical means, the target site to a position that may be specified by the physical feedback signal.

It is noted that, in some embodiments, the target action for assisted feedback unit 160 may correspond to an action being performed in the virtual environment. For example, a physical feedback signal may specify a target action of a walking motion to be performed by assisted feedback unit 160. The physical feedback signal may correspond to the virtual action being performed in the virtual environment. As the virtual action being performed in the virtual environment is responsive to the characteristics of the user, it will be appreciated that the physical feedback provided by assisted feedback unit 160 may be similarly responsive to the user's characteristics. Thus, a target action may be coordinately performed virtually and physically, and the patient may be able to perceive the action virtually and/or physically, responsive to the patient's limitations, due to the cooperative operation of system 100.

Figure 2:
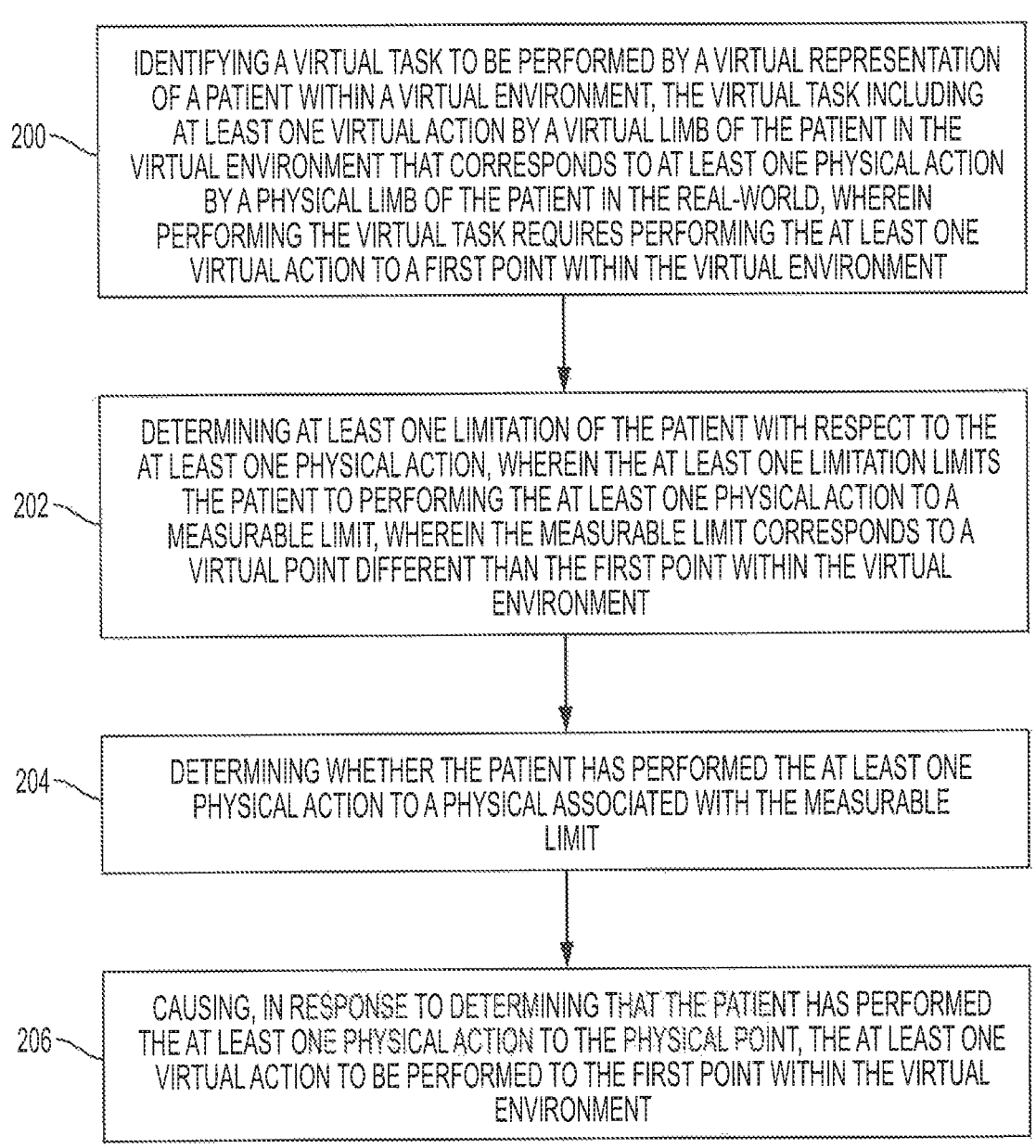
FIG. 2 shows a functional block diagram illustrating an example flow executed to implement aspects of the present disclosure.

Operations of system 100 to provide functionality in accordance with the present disclosure will now be discussed with respect to the flowchart shown in FIG. 2. FIG. 2 shows a diagram illustrating example blocks executed to implement one aspect of the present disclosure. The procedure according to this example aspect details steps for implementing a process in accordance with the present disclosure. The process may be performed during use of system 100 to provide virtual environments that are responsively adaptable to users' characteristics in accordance with aspects of the present disclosure. At block 200, a virtual task to be performed by a virtual representation of a patient within a virtual environment may be identified. In some embodiments, the virtual task may be part of a virtual retail therapy and may include virtual actions such as traversing virtual shopping aisles, reaching for and grabbing virtual objects off the virtual shelves, and depositing the objects into a virtual cart. The virtual actions in the virtual environment may have a corresponding physical action in the real-world. For example, a virtual action of reaching for and grabbing a virtual object off a shelf performed by a virtual avatar of a patient may correspond to a physical action of extending a physical arm toward a location in the real-world that corresponds to the virtual location of the virtual object, and performing a grabbing motion in the real world. In aspects, the physical action may involve an action by an affected limb of a physical therapy patient. In this example, grabbing the virtual object off the shelf may require extending the virtual limb to the point, or virtual target area, where the virtual object is on the shelf. However, the patient may have limitations that prevent the patient from extending his or her arm to a point or location, in the real-world, that corresponds to the virtual point or location in the virtual environment where the virtual object may be located. It is noted that, as used herein, a point may refer to a three-dimensional location, area, space, or threshold, within the respective environment. For example, a virtual point may refer to the virtual space, location, or area, within the virtual environment. Similarly, a physical point may refer to the physical space, location, or area, within the real-world environment. As such, when referring a target virtual point where the virtual object may be located, this may refer to a three-dimensional virtual space, virtual area, or virtual threshold around the virtual object. Similarly, when referring a physical point to which a physical action may be performed, this may refer to a three-dimensional physical space, physical area, or physical threshold in the real-world.

At block 202, at least one limitation of the patient with respect to the physical action may be determined. In some aspects, the at least one limitation may limit the patient to performing the physical action to a measurable limit. For example, the at least one limitation of a patient may prevent the patient from extending an arm further than 40%. In another example, a patient may have mobility limitations and thus, may be unable to walk, stand, or may be unable to walk faster than a particular speed, or farther than a particular distance. In these aspects, the measurable limit to which the patient may be able to perform the action may correspond to a virtual point in the virtual environment. This virtual point may be different than the first point to which the virtual action is to be performed. For example, a patient with 40% arm flexion may be able to extend his or her arm to a physical point corresponding to 40%, which may correspond to a particular virtual point within the virtual environment. In this example, grabbing a virtual object off the shelf in the virtual environment may require extending the virtual arm of the patient to a point that corresponds to 70% flexion. Thus, the point to which the patient may be able to extend his or her arm may fall before the virtual point to which the virtual arm should be extended to grab the virtual object.

In some embodiments, the at least one limitation of the patient with respect to the physical action may be determined from information stored in a database, such as database 150. The stored information may include patient profile information and may include values corresponding to the limitation measurable limits. In some cases, the information may be provided beforehand by the patient or by a therapist to be stored in the database and subsequently retrieved.

At block 204, a determination is made as to whether the patient has performed the physical action to a physical point associated with the measurable limit. In embodiments, the physical point may be equal to the measurable limit of the patient's limitations. For example, a patient with a limitation of 40% arm flexion may be determined to have performed the physical action when it is determined that the patient has extended the arm to 40%. In other embodiments, the physical point may be a fraction or percentage of the measurable limit. For example, the physical point may be 10% of the patient's measurable limit. In this case, the patient with a limitation of 40% arm flexion may be determined to have performed the physical action when it is determined that the patient has extended the arm to 44%.

In embodiments, determining whether the patient has performed the physical action to the physical point may be made using sensor data collected by sensors, such as sensors 130 of FIG. 1. In these embodiments, the sensor data provides information that controller 110 may process to determine the conformation, location, movement, speed, velocity, tilt, position, force, acceleration, etc., measured at the physical limb of the patient. For example, sensor data collected from a patient with 40% arm flexion may indicate that the patient has extended his or her arm to 40% flexion. This may indicate that the patient has performed the physical action to the measurable limit.

In yet another embodiment, determining whether the patient has performed the physical action to the physical point may include determining whether the patient's physical action has paused at a particular point and for a particular period of time. The particular point at which the patient's physical action may have paused may correspond to a virtual point within the virtual environment. In some aspects, the virtual action may include interacting with virtual objects, such as by grabbing the virtual objects. In these aspects, an area of interactivity may be established around the virtual objects. This allows the system to determine that a patient has performed the physical action by determining that the corresponding virtual avatar of the patient has entered the area of interactivity of the virtual object and remains within the area of interactivity for at least a predetermined period of time. Thus, when the virtual avatar of the patient enters the area of interactivity of an object, and the virtual avatar remains within the area of interactivity for at least the predetermined period of time, the system may determine that the patient has performed the corresponding physical action. In some embodiments, the area of interactivity may be established such that the area encompasses a virtual point corresponding to the measurable limit of the patient's limitations.

At block 206, the virtual action may be caused to be performed to the first point within the virtual environment in response to determining that the patient has performed the physical action to the physical point. In embodiments, causing the virtual action to be performed may include modifying the virtual environment such that first point corresponds to the physical point to which the physical action was performed. For example, for a user with arm flexion limitations of 40%, the physical action may be determined to be performed when the user extends his or her arm to 40%. However, reaching the virtual object within the virtual environment may require a 70% arm flexion. In this case, the virtual environment is modified such that the user may be able to reach and grab the virtual object with 40% flexion. For example, in some embodiments, the virtual object is modified and brought closer to the patient's virtual avatar such that the user may grab the virtual object. In other embodiments, the user's virtual avatar may be moved toward the virtual object such that the virtual object may be grabbed by the user. In yet other embodiments, the entire virtual shelf, in which the virtual object may be located, may be moved toward the user virtual avatar such that the user may grab the virtual object.

Figure 3:
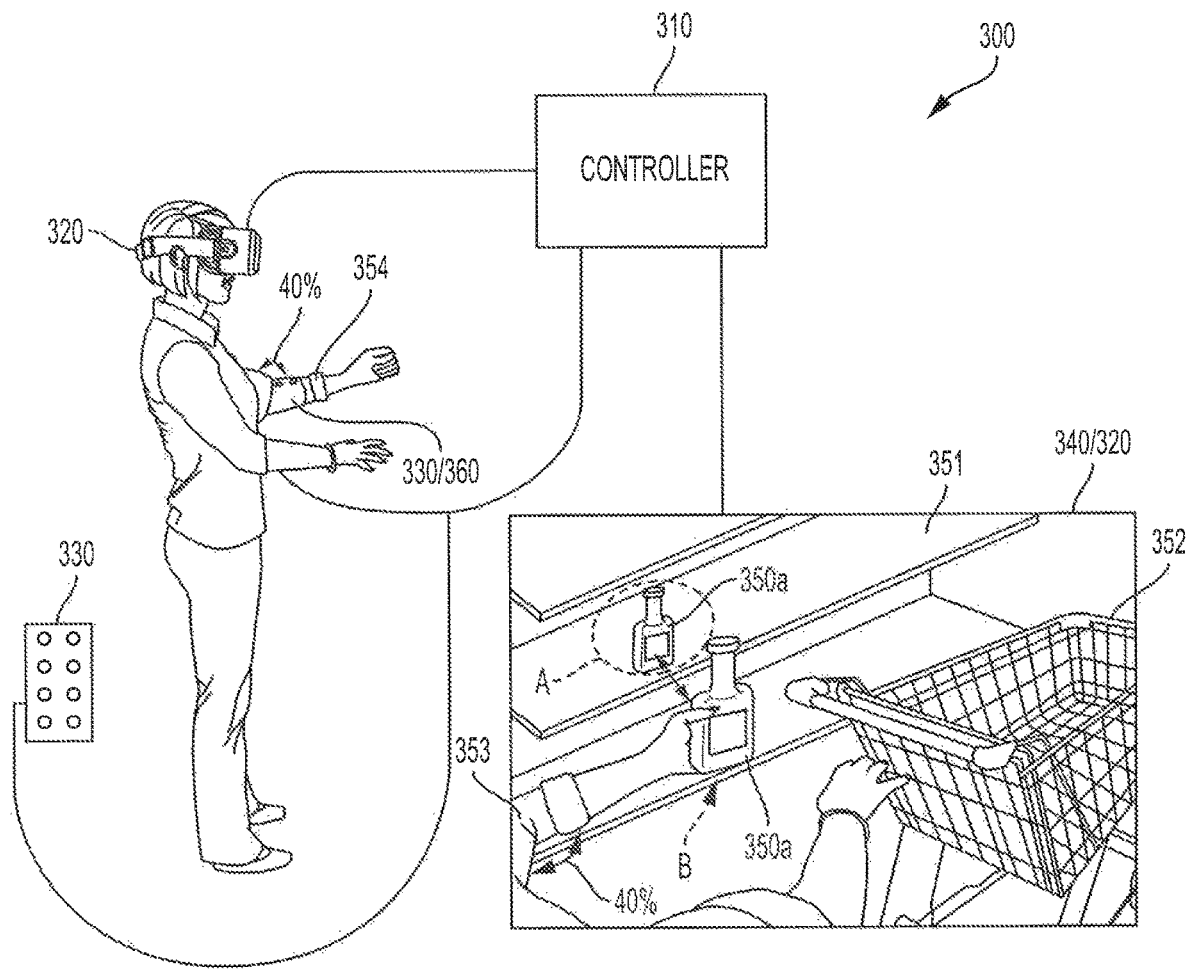
FIG. 3 shows another example of a system configured to perform operations in accordance with embodiments of the invention.

FIG. 3 illustrates an example embodiment implemented in system 300 in accordance with aspects of the present disclosure for providing functionality as discussed herein. In this example, during operation, a therapy patient suffering from limited motor function may be connected into system 300. In this example, the therapy patient may have lost, or may have limited flexion of the right arm, as illustrated in FIG. 3. The therapy patient may be connected to system 300 by placing neural VR display 320 upon the patients head, and sensors 330 upon the patient's arms. VR display 320 may be a VR headset, or may be a virtual display configured to display the virtual environment shown in I/O unit/VR display 340/320, as illustrated in FIG. 3. Optionally, assisted feedback unit 360 may be placed upon the therapy patient's right arm. As discussed above, I/O unit/VR display 340/320 may display the virtual environment into which the patient's has been immersed. In this example, the virtual environment simulates a retail store having multiple aisles. The multiple aisles may have multiple shelves at different height levels, and the shelves may objects at different heights and depth levels. The virtual environment in this example may be configured to permit and/or require the patient, within the virtual environment, to grab virtual objects, such as virtual object 350a off a virtual shelf 351, and to deposit the virtual object 350a into virtual cart 352. The virtual actions of reaching for and grabbing virtual object 350a may be performed by virtual arm 353, and may have a corresponding physical action performed by the user's physical arm 354. For example, a physical action performed by physical arm 354 may be replicated in the virtual environment as a virtual action by virtual arm 353. In this manner, reaching for and grabbing virtual object 350a within the virtual environment may require performing a reach and grab action in the physical real-world.

In this example, VR display 320, sensors 330, I/O unit 340, and assisted feedback unit 360 may be communicatively coupled to controller 310, which may be the same as controller 110 of FIG. 1. In some embodiments, the communication between controller 310, VR display 320, sensors 330, I/O unit 340, and assisted feedback unit 360 may be via a wired connection. In other embodiments, each of controller 310, VR display 320, sensors 330, I/O unit 340, and assisted feedback unit 360 may be configured for wireless communication and, in these cases, communications between the different components may be wireless communications. Further, in some embodiments, sensors 330 and assisted feedback unit 360 may be implemented as a single unit, such as in an arm brace. In some embodiments, sensors 330 may be standalone sensors, not mounted upon the patient.

In one example case, a therapist may optionally enter patient information, such as threshold values, timers, and area of interactivity information using an I/O unit, such as I/O unit 140 of FIG. 1. The therapy patient may navigate the virtual environment and may desire to reach for and grab object 350a, located at point A on virtual shelf 351 within the virtual environment. The patient's ultimate desire is to then deposit virtual object 350a into virtual cart 352. In this example case, reaching for and grabbing object 350a from point A may require a 70% flexion motion from where the patient's virtual arm 353 may be. However, the patient's physical arm 354 may have a flexion limitation, which may limit the patient to extending physical arm 354 to 40% flexion. Extending physical arm 354 to 40% may bring arm 354 to a physical point that may correspond to virtual point B within the virtual environment. Virtual point B and virtual point A are not the same and thus, virtual object 350a may not be grabbed at point B at this time.

The therapy patient may extend physical arm 354 to 40% flexion intending to move corresponding virtual arm 353 toward virtual object 350a located at point A. In some embodiments, sensors 330 may capture sensor data corresponding to the physical action by the patient, and the sensor data may be provided to controller 310. Controller 310 may process the sensor data and may determine that the patient has extended the virtual arm to point B. In some embodiments, controller 354 may also determine that point B corresponds to the physical point of the 40% extension by the patient.

In some embodiments, controller 310 may determine whether point B is within an area of interactivity that may have been established around virtual object 350a. If controller 310 determines that point B is within an area of interactivity around virtual object 350a, controller 310 may then determine whether virtual arm 353 remains within the area of interactivity of virtual object 350a for a predetermined amount of time. This may be done using a timer. At the expiration of the timer, controller 310 may check whether virtual arm 353 remains within the area of interactivity around virtual object 350a. If controller 310 determines that virtual arm 353 has remained within the area of interactivity of virtual object 350a for the predetermined amount of time, then, in response to that determination, controller 310 may modify the virtual environment such that object 350a may be grabbed by the patient. In one particular embodiment, controller 310 automatically moves object 350a from point A to point B, such that object 350a may be grabbed by the patient. The patient may then grab object 350a at location B. In a similar responsively adaptable process, the patient may then deposit object 350a into cart 352 an thus, complete the required virtual tasks despite the patient's physical limitations In this manner, system 300 may be configured to provide a virtual environment that is responsively adaptable to a patient's characteristics or limitations, and by which a patient may be encouraged to persist in therapy. Thus, system 300 represents an improvement over existing systems.

Optionally, a physical feedback signal may be generated by controller 340, and may be provided to assisted feedback unit 360. In response to the physical feedback signal, an assisted physical action may be performed by assisted feedback unit 360, in the real-world environment, corresponding to the reaching for and grabbing the virtual object. For example, assisted feedback unit 360 may apply mechanical force or resistance upon the therapy patient's right arm in order to assist or force the therapy patient's right arm in performing the arm extension action. In aspects, the assisted physical action may be performed within flexion limits associated with the therapy patient's. Thus, when extending the therapy patient's arm beyond a particular limit may be counter indicated, the patient's right arm may not be fully extended, but may be extended to within those limits.

In some cases, the limits may be increased as therapy progresses in order to ensure that the patient's flexion is improving. In some embodiments, the assisted physical action may correspond to the required virtual action and may be completed such that the patient's arm is extended to a physical threshold that corresponds to the target area within which the virtual object may be located. For example, the physical action may be performed, with assistance from assisted feedback unit 360, by the patient, to the 70% flexion required by the virtual action, despite the patient's physical limitation of 40% flexion. Thus, in this case, assisted physical unit 360 may assist the patient in performing the physical action to the required virtual limit, and beyond the patient's actual physical limits. It is noted that, in some implementations, assisted feedback unit 360 may comprise a device configured to assist other types of physical movements, such as closing of a hand, walking, running, standing, etc.

It is noted that, in some implementations, the responsively adaptable virtual environment of the present systems may be implemented in situations in which disparate users may participate. For example, a particular VR game may allow an adult and a child to participate in multiplayer mode. In some cases, the players may play in cooperative mode or may play against each other. As will be appreciated, the skills of the players may differ substantially, although not always to the adult's advantage. In any case, by implementing the responsively adaptable virtual environments discloses herein, the game's virtual environment may be adapted in response to the individual player's skills. In this manner, the VR game may be made competitive by leveling the playing field for all the players, regardless of the skills, as the game's virtual environment may adapt to each individual players. For example, where a player is able to run much faster than another player, the system may operate to adapt the virtual environment such that the gait of the slower player is increased, thereby increasing the player's speed. The modifications of the virtual environment may be made such that the skills of the difference players are "leveled." Thus, where the slower player's speed is increased, it may not be increased to be much faster than the second player. As will be appreciated, a system implemented in this way may reward a player's efforts, rather than the player's ability, and may be made more enjoyable by being more competitive across different skill levels.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-3 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of responsively adapting a virtual environment to physical therapy patients, the method comprising:
   identifying a virtual task to be performed by a patient within a virtual environment, the virtual task including a first virtual action by a virtual limb of the patient in the virtual environment that corresponds to a first physical action by a physical limb of the patient in the real-world, wherein performing the virtual task requires performing the first virtual action to a target area within the virtual environment;
   determining that the patient has a limitation with respect to the first physical action, wherein the limitation limits the patient performing the first physical action;
   determining whether the patient has performed the first physical action to a physical threshold area, wherein the physical threshold area corresponds to an area in the virtual environment to which the virtual limb is reaching, and wherein the area is different than the target area; and
   causing, in response to determining that the patient has performed the first physical action to the physical threshold area, the virtual environment to dynamically adjust while the first physical action is being performed, said adjustment causing the completion of the first virtual action.

2. The method of claim 1, wherein the limitation limits the patient to performing the physical action to a particular physical area, and wherein the physical threshold area corresponds to the particular physical area.

3. The method of claim 1, wherein the limitation limits the patient to performing the first physical action to a particular physical area, and wherein the physical threshold area corresponds to a threshold value associated with the particular physical area, wherein the threshold value is one of: a value within a predetermined threshold of the physical threshold area, and a value over the predetermined threshold of physical threshold area.

4. The method of claim 1, wherein the determining whether the patient has performed the first physical action to at least the threshold area is based on sensor data corresponding to at least one of a conformation, location, movement, speed, velocity, tilt, and position of the physical limb.

5. The method of claim 4, wherein the sensor data is obtained from at least one sensor configured to be mounted upon the physical limb of the patient.

6. The method of claim 4, wherein the sensor data is obtained from at least one sensor configured to be mounted external to the patient.

7. The method of claim 1, wherein the first virtual action includes interacting with at least one virtual object of the virtual environment, and wherein the at least one virtual object is located within the virtual space corresponding to the physical threshold area.

8. The method of claim 7, further comprising establishing an area of interactivity around the at least one virtual object, and wherein the determining whether the patient has performed the first physical action to the physical threshold area includes determining whether the virtual limb has entered the area of interactivity around the at least one virtual object.

9. The method of claim 8, wherein the determining whether the patient has performed the first physical action to the physical threshold area further includes determining whether the virtual limb has remained within the area of interactivity for at least a predetermined period of time.

10. The method of claim 7, wherein the causing the virtual environment to dynamically adapt in order to allow the first virtual action to be performed within the virtual environment includes modifying the virtual environment to bring the at least one virtual object to the virtual space corresponding to the physical threshold area.

11. The method of claim 10, wherein the determining whether the patient has performed the first physical action to the physical threshold area includes determining that the patient is currently performing the first physical action, and wherein the modifying the virtual environment to bring the at least one virtual object to the virtual space corresponding to the physical threshold area includes gradually moving the at least one virtual object to the virtual space as the patient performs the first physical action such that the patient perceives the gradually moving the at least one virtual object to the virtual space as a smooth operation.

12. A system for responsively adapting a virtual environment to physical therapy patients, the system comprising:
   at least one sensor configured to detect data associated with a physical limb of a patient;
   a virtual representation unit configured to display a virtual environment, the virtual environment including at least one interactable virtual object located at a target area of the virtual environment, and a virtual representation of the patient within the virtual environment; and
   a controller communicatively coupled to the at least one sensor and the virtual representation unit, the controller configured to:

identify a virtual task to be performed by the patient within the virtual environment, the virtual task including a first virtual action upon the at least one interactable virtual object by a virtual limb of the patient within the virtual environment, the first virtual action corresponding to a first physical action by the physical limb of the patient in the real-world, wherein performing the virtual task requires performing the first virtual action to the target area within the virtual environment;

determine that the patient has at least one limitation with respect to the first physical action, wherein the at least one limitation limits the patient performing the first physical action;

determine, based on the data detected by the at least one sensor, whether the physical limb of the patient has performed the first physical action to a physical threshold, wherein the physical threshold area corresponds to an area in the virtual environment to which the virtual limb is reaching, and wherein the area is different than the target area; and cause, in response to determining that the patient has performed the first physical action to the threshold area, the virtual environment to dynamically adjust, while the first physical action is being performed, to complete the first virtual action within the virtual environment.

13. The system of claim 12, wherein the at least one limitation limits the patient to performing the first physical action to a particular physical area, and wherein the physical threshold area corresponds to the particular physical area.

14. The system of claim 12, wherein the data detected by the at least one sensor includes at least one of a conformation, location, movement, speed, velocity, tilt, and position of the physical limb.

15. The system of claim 12, wherein the at least one sensor is configured to be mounted upon the physical limb of the patient.

16. The system of claim 12, wherein the at least one sensor is configured to be mounted external to the patient.

17. The system of claim 12, wherein the controller is further configured to:

establish an area of interactivity around the at least one interactable virtual object; and determine whether the physical limb has performed the first physical action to the physical threshold area by determining whether the virtual limb has entered the area of interactivity around the at least one interactable virtual object.

18. The system of claim 17, wherein the configuration of the controller to determine whether the physical limb has performed the first physical action to the physical threshold further includes configuration of the controller to determine whether the virtual limb has remained within the area of interactivity for at least a predetermined period of time.

19. The system of claim 12, wherein the configuration of the controller to cause the virtual environment to adapt in order to allow the first virtual action to be performed within the virtual environment includes configuration of the controller to modify the virtual environment to bring the at least one interactable virtual object to the virtual space corresponding to the physical threshold.

20. A method of responsively adapting a virtual environment to a user, the method comprising:

identifying a virtual task to be performed by a virtual representation of a user within a virtual environment, the virtual task including a first virtual action by the virtual representation of the user in the virtual environment that corresponds to a first physical action by the patient in the real-world, wherein performing the virtual task requires performing the first virtual action to a first level of performance;

determining that the patient has at least one limitation with respect to the first physical action, wherein the at least one limitation limits the user to performing the first physical action to a second level of performance different than the first level of performance;

determining that the user has performed the first physical action to at least the second level of performance; and causing, in response to determining that the user has performed the first physical action to at least the second level of performance, the virtual environment to dynamically adapt, while the first physical action is being performed, to complete the first virtual action within the virtual environment.

* * * * *

UNITED STATES PATENT AND TRADEMARK OFFICE
CERTIFICATE OF CORRECTION

PATENT NO. : 10,705,596 B2
APPLICATION NO. : 15/975451
DATED : July 7, 2020
INVENTOR(S) : Veena Somareddy It is certified that error appears in the above-identified patent and that said Letters Patent is hereby corrected as shown below:

On the Title Page

In item (73) Assignee, delete "Neurolofical Rehabilitation Virtual Reality, LLC" and replace with --Neurological Rehabilitation Virtual Reality, LLC--.

Signed and Sealed this
Twenty-second Day of September, 2020

Andrei Iancu
*Director of the United States Patent and Trademark Office*